United States Patent [19]

Fleuret

[11] Patent Number: 4,553,304
[45] Date of Patent: Nov. 19, 1985

[54] METHOD FOR THE PRODUCTION OF A MULTILAYERED CAPACITOR BLOCK

[75] Inventor: Daniel Fleuret, Bagnolet, France

[73] Assignee: Thomson CSF, Paris, France

[21] Appl. No.: 499,398

[22] Filed: May 31, 1983

[30] Foreign Application Priority Data

Jun. 4, 1982 [FR] France ............................ 82 09732

[51] Int. Cl.⁴ .............................................. H01G 4/26
[52] U.S. Cl. ....................................... 29/25.42; 29/609
[58] Field of Search ............................... 29/25.42, 609; 242/56.1

[56] References Cited

U.S. PATENT DOCUMENTS 825,405  7/1906  McGrath ..................... 29/25.42 X
2,654,060  9/1953  Stovall, Jr. et al. .......... 29/25.42 X Primary Examiner—Carl E. Hall
Attorney, Agent, or Firm—Cushman, Darby & Cushman

[57] ABSTRACT

A method for the production of a multilayer capacitor block.

Two superposed metallized films are carried by an entraining caterpillar track into a cavity in such a manner as to form a stack of successive folds. In a first operation, the horizontal displacement of a support performs a transverse compression of the stack, and the displacement of a movable bar performs a vertical compression of the stack. The stack thus compressed is then coated with molten metal by spraying, in such a manner as to form an elementary block.

12 Claims, 11 Drawing Figures

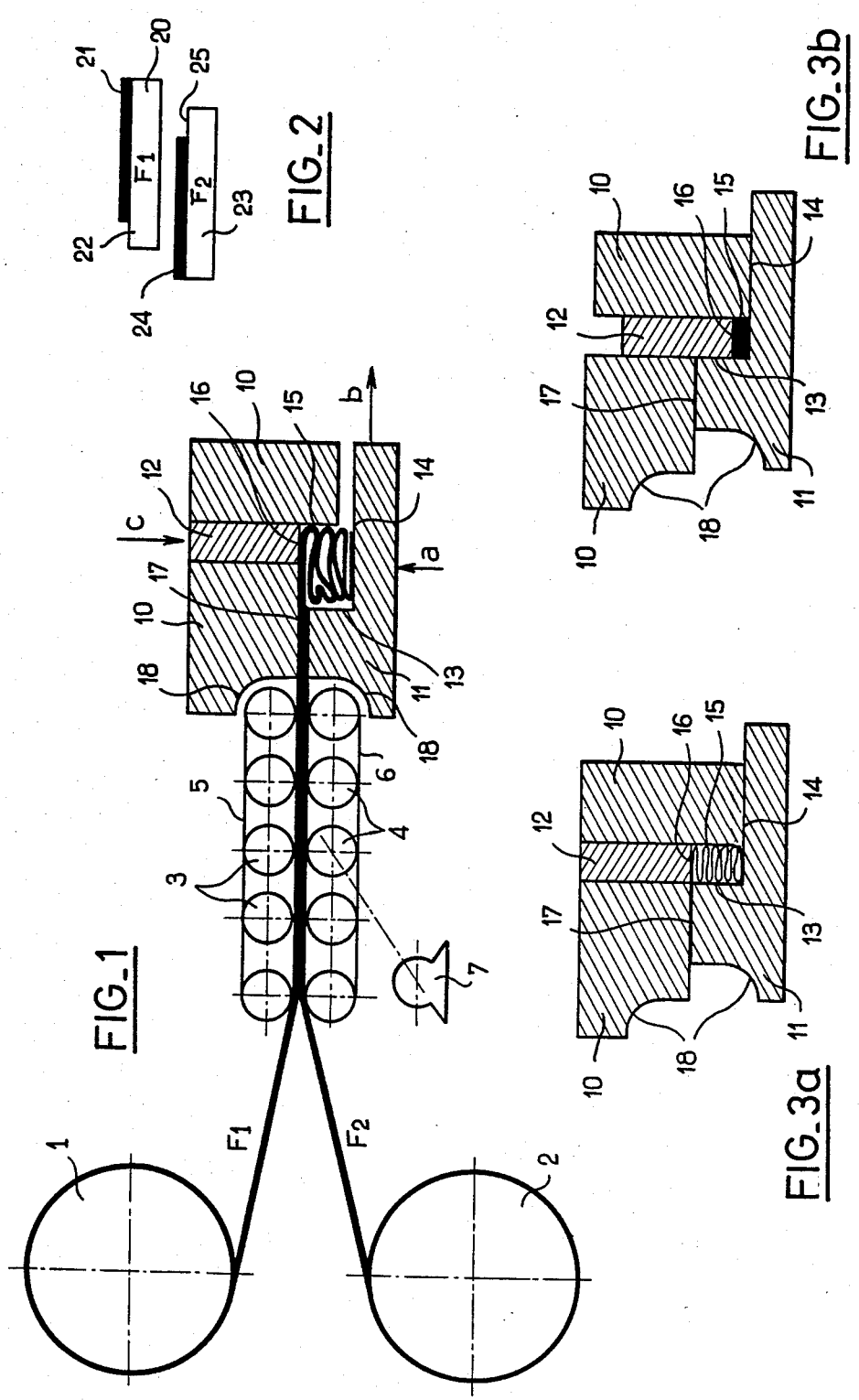

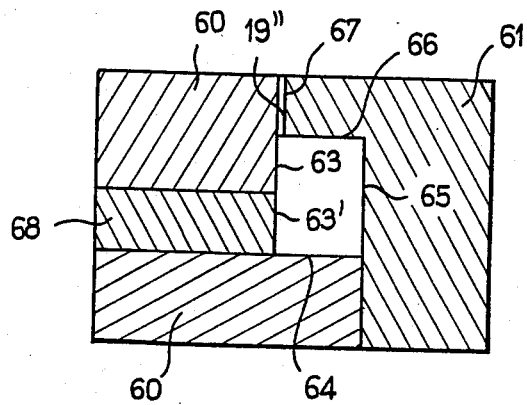
FIG_6
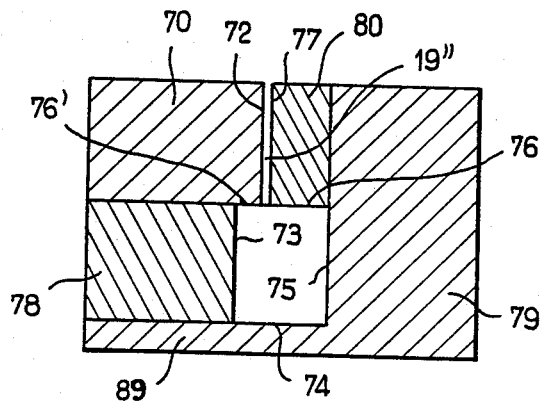
FIG_7

FIG_8
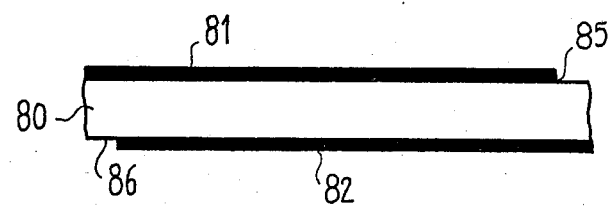
FIG_9
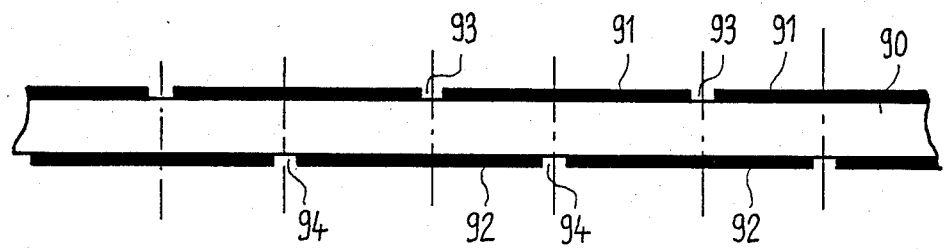
FIG_10
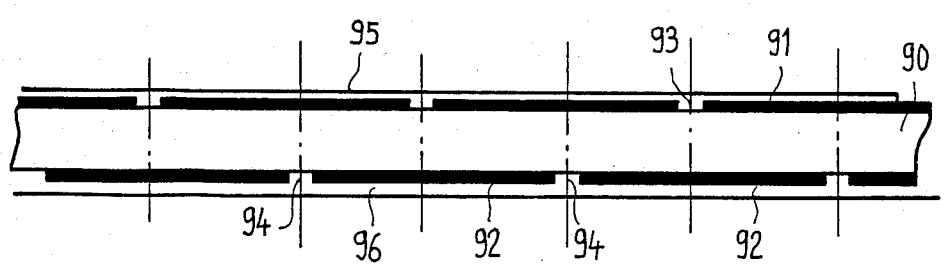

METHOD FOR THE PRODUCTION OF A MULTILAYERED CAPACITOR BLOCK

The present invention has as its object a method for the production of a multilayer capacitor block and to a device for its application.

BACKGROUND OF THE INVENTION

Already known is a method for the production of multilayer capacitors by helical winding of two films on a roller with the interpositioning of intermediate layers, in such a manner as to divide the winding into several superposed mother capacitors. The lateral edges of the layers are then coated completely with a contact metal, and the mother capacitors intended to provide separator capacitors by cutting are thereafter separated.

This method has a variety of shortcomings. On the one hand, it requires several handling operations, on the other hand for carrying the roller or wheel from the plant at which the winding is formed, to the processing station at which the coating operation with molten metal is performed by spraying (schoopage), followed by operations for separating the intermediate layers and the mother capacitors which are conveyed to a machine on which is to be performed their cutting into a plurality of elementary multilayer capacitor blocks. On the other hand, the winding of metallised films on a wheel does not make it possible to apply to these a sufficiently great machanical tension to prevent gas from being trapped within the capacitor. Such a gas presence within the capacitor actually impairs its resistance against an alternating field. This action is attributable to the deterioration of the capacitor by ionisation.

The present invention relates to a method for the production of an elementary multilayer capacitor block which is not subject to these disadvantages.

SUMMARY OF THE INVENTION

The process in accordance with the invention comprises the following steps:
(a) unwinding at least one metallised film which forms a succession of alternately insulating and conductive layers comprising laterally offset metallisations;
(b) at least partially filling a recess or cavity by means of the said strips under at least the action of gravity, in such a manner as to form successive folds stacked along a longitudinal direction and of which at least some are in contact with two edges of the recess or cavity situated in a first lateral direction, the lateral edges of the said metallised film being situated in a second lateral direction:
(c) compressing the stacked successive folds along the longitudinal direction;
(d) equipping the block with electrical connections.

The stage (d) may consist in a coating operation with molten metal by spraying (schoopage) along the second lateral direction of the lateral edges of the said film.

According to one embodiment, the method comprises a stage (b') inserted between the stages (b) and (c) or between the stages (c) and (d), for compression of the stacked successive folds along the first transverse direction.

Following the stage (b), the method may include a preliminary stage (b'') for compression of the stacked successive folds along the longitudinal direction.

According to advantageous embodiment, the block is heated during the compressing operation in such a manner as to facilitate the latter. As a modification, the heating temperature is selected in such a manner that it ensures heat treatment of the blocks.

According to a preferred embodiment, the film is coated on at least one of its surfaces with a lacquer assuring the bonding of the stack during the compressing operation. The film may have a plurality of laterally spaced apart metallisations, so that the block obtained is a mother capacitor which is cut into individual blocks before the steps (d).

The invention equally relates to a device comprising a compression block for application of the method defined in the foregoing. It comprises:
(a) at least one reel carrying at least one metallised film;
(b) a device for film application and entrainment;
(c) a first support comprising a step or the like, forming a first longitudinal side and a second lateral side of a recess or cavity;
(d) a second support comprising a step or the like, forming a third longitudinal side and a fourth lateral side of the recess or cavity;
(e) a longitudinal entrainment device arranged in such a manner as to modify the distance between the first and third longitudinal sides;
and in that the film application and entrainment device is arranged in such a manner that the stacking action occurs on the first longitudinal side and that at least some of the successive folds are in contact with the said second and fourth lateral sides.

According to one embodiment, the device comprises a device for coating the lateral edges of the said film with molten metal by spraying (schoopage).

According to one embodiment, the device comprises a lateral entrainment device arranged in such a manner as to modify the distance between the second and fourth lateral sides.

The device for application and entrainment of the said film may comprise two endless tracks, each carrying a rolling belt.

At least one of the entraining devices may comprise a rod movable in a seat of the corresponding support. One of the entraining devices may then comprise means of displacing the corresponding support.

According to a variant, the device comprises at least one member forming at least one fifth lateral side of the recess or cavity, in contact with the edges of the said film of the stack. The said member may be removable.

The film application and entrainment device may be arranged in such a manner that the said films are fed into the upper part of the recess or cavity in a substantially vertical direction.

According to a preferred embodiment, the compression block comprises means of heating the block during compression, in such manner as to facilitate the latter. As a modification, the temperature is selected to be such as to provide heat treatment of the said block whilst promoting compression.

BRIEF DESCRIPTION OF THE DRAWINGS

The invention will now be further described, with reference to the accompanying drawings, in which:

FIG. 1 illustrates a cross-sectional view of a device for application of the method according to the invention, FIG. 2 illustrates the stacking of two metallised films, FIGS. 3a and 3b illustrate the compression stages of the stack of films resulting from utilisation of the device of FIG. 1, FIGS. 8 to 10 illustrate modified forms of films utilisable in accordance with the invention.

DESCRIPTION OF THE PREFERRED EMBODIMENTS

Figure 4:
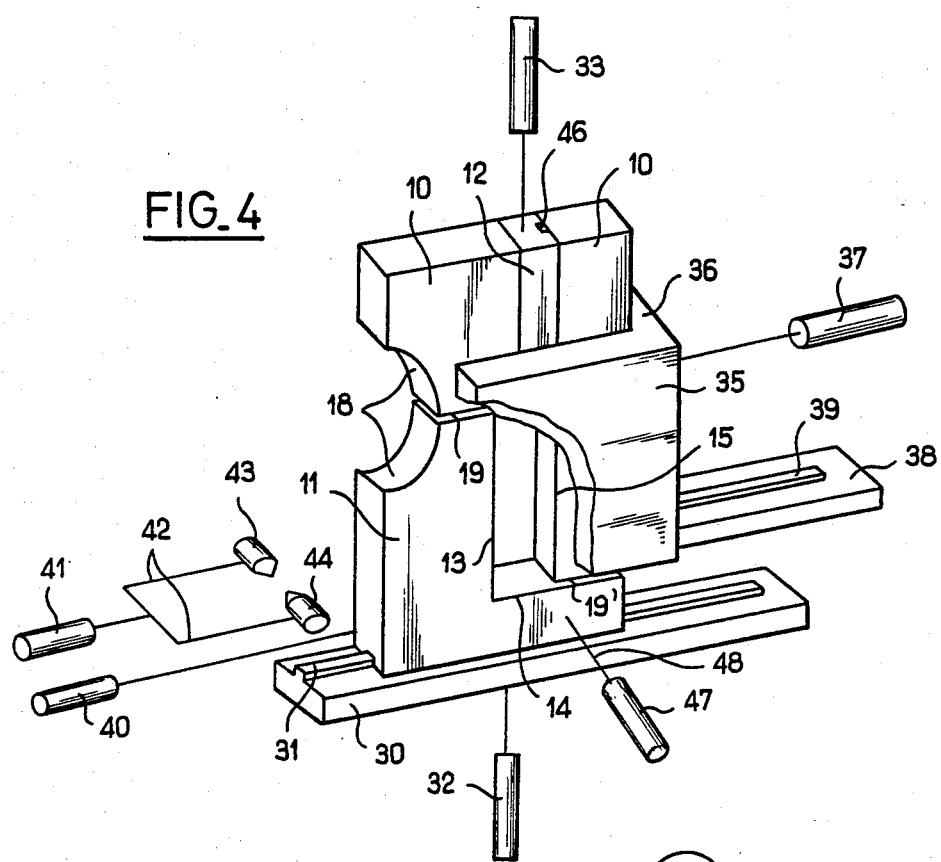
FIG. 4 is a perspective view of a device according to FIG. 1, FIGS. 5 to 7 illustrate modified forms of the devices in accordance with the invention.

According to FIG. 1, two metallised films $F_1$ and $F_2$ are unwound from two reels 1 and 2, respectively. The entraining device comprises two series of rollers 3 and 4 around which are disposed belts 5 and 6. The spacing between the rollers is selected in such a manner that when these are entrained by a motor 7, the films $F_1$ and $F_2$ are applied one on the other in such a manner as to expel the air remaining trapped between the two films. This preliminary operation performs a laminating operation on the films which equally plays a part in maintaining a relative position of the one with respect to the other. According to FIG. 2, the film $F_1$ is actually formed by an insulating film 20 coated with a metallisation 21 situated on its upper surface. This metallisation extends from the right-hand edge of the film and is terminated at a particular distance from the left-hand edge whilst leaving an uncoated space 22. Similarly, the film $F_2$ is formed by an insulating film 23 coated on its upper surface with a metallisation 24 extending from the left-hand edge of the film and interrupted at a particular distance from its right-hand edge, leaving an uncoated space 25. In a manner known per se, the films $F_1$ and $F_2$ are fed with a particular lateral offset or runout in such a manner as to allow the subsequent establishing of contacts on the lateral edges of the films by a coating operation with molten metal by means of spraying (schoopage). Thus, according to FIG. 1, the films are directed by the entraining device comprising rollers to a cavity of a pressing block or unit, in which they will form a stack of successive folds. This cavity is delimited on the one hand by a support 11 comprising a step which horizontally forms a first longitudinal side 14 and vertically forms a second lateral side 13 of the cavity. On the other hand, it is delimited by a second support 10 comprising a step which horizontally forms a third longitudinal side 17 and vertically forms a fourth lateral side 15 of the cavity. A rod 12 is movable in a seat of the bearer 10 and opens in the longitudinal wall 17. Supports 10 and 11 together define recessed surfaces 18 to permit one end of belts 5 and 6 to be adjacently positioned relative thereto.

An elementary multilayer capacitor block is produced in the following manner. Under the action of gravity, the cavity is filled with the said strips supplied by the roller device driven by the motor 7 and forming successive folds stacked on the longitudinal surface 14. The lateral sides 13 and 15 delimit the edges of at least some of the folds of the stack. Upon reaching a film length corresponding to the value of the required capacity, the feed of the sheet is stopped. After possible severing of the films, the pressing block is reclosed by translatory displacement in a vertical direction of the lower support 11. During a second operation, the support 11 is translatorily displaced towards the right in such a manner as to reduce the width of the cavity. According to FIG. 3a, this displacement continues until the sidewall 13 is in alignment with one side of the movable rod or bar 12 of rectangular cross-section. The compression of the elementary block is then completed by the action of the movable bar 12 which compresses the stack longitudinally (FIG. 3b). After an eventual "schoopage" coating operation with molten metal by spraying, the block may be ejected and is ready to receive electrical contacts and possibly a casing, in such a manner as to form an elementary capacitor.

Consequently, it is observed that the method in accordance with the invention renders it possible to produce an elementary block in a wholly automatic manner at one working station only.

On the other hand, an elementary block of this nature provides a direct galvanic continuity between the inserts of identical polarity, and prevents accidental separation of layers bearing poor contacts, for example in the area of a possible molten metal coating action by spraying. The result thereof is that the capacitor plates may be connected by any means, schoopage coating with molten metal by spraying however remaining a preferred method inasmuch as it plays a part in maintaining the cohesion of the capacitor.

The block may be equipped with electrical connections at the level of its plates outside the compression unit, on an apparatus known per se, for example a plant for coating conventional wound capacitors with molten metal by spraying.

According to FIG. 4, the pressing unit comprises a support 10 in two parts between which is situated the displaceable bar 12 driven by a ram 33 sliding along a slideway 46. The part of the support 10 positioned upstream is separated from the support 11 by a space 19 through which pass the films. When the stack of films is formed in the cavity delimited by the slides 13, 14, 15 and 16, a ram 32 vertically displaces a plate 30 whereon the support 11 is installed in such a manner as to close the gaps 19 and 19' of the pressing unit. This preliminary operation is optional. A ram 40 then displaces the support 11 along a slideway 31 carried by the plate 30. The stacked films are thereby compressed in a transverse direction. The following operation consists in longitudinal compressing the films by displacement of the movable bar 12 along a slideway 46 by means of a ram 33. According to a preferred embodiment, the films are held laterally during their compression by means of a U-shaped element comprising a central part 36 and two lateral branches 35 which form a fifth and sixth sides of the cavity. The spacing between the two branches 35 of the U is such that it corresponds to the width of the stacked films (including the offset: see FIG. 2). Upon completing the compression operations, the U-shaped element is freed from the cavity by means of a ram 37. To this end, it slides along a slideway 39 of a plate 38. Once the cavity has been cleared, it is possible to perform the coating operation with molten metal by spraying. To this end, two schoopage spraying nozzles 43 and 44 carried by a fork 42 are placed in position by a ram 41. The molten metal coating operation by spraying may be performed in conventional manner via a mask which is not illustrated. Once the schoopage coating operation has been completed, the nozzles 43 and 44 are returned to the idle position, and the elementary block produced in this manner may be ejected by means of the rod 48 of an ejector ram 47.

The compression unit advantageously comprises means for heating the stacked films. For example, these are heating resistances placed within the mass of the component elements of the compression unit. During the compressing action, the block may thereby be brought to a temperature which is preferably selected to be such as to assure heat treatment of said block, in conditions known to one versed in the art, whilst promoting the compressing operation and consequently the mechanical strength of the block after compression. A heat treatment of this nature, performed between 100° and 200°, permits the film being strain-relieved and stabilised, as well as of compacting between the layers by shrinkage of the film, if appropriate.

The films $F_1$ and $F_2$ may advantageously be coated, preferably on both surfaces, with a layer of lacquer rendering it possible to assure the bonding of the stack during the compression stage, the latter preferably being performed under heating action.

Figure 5:
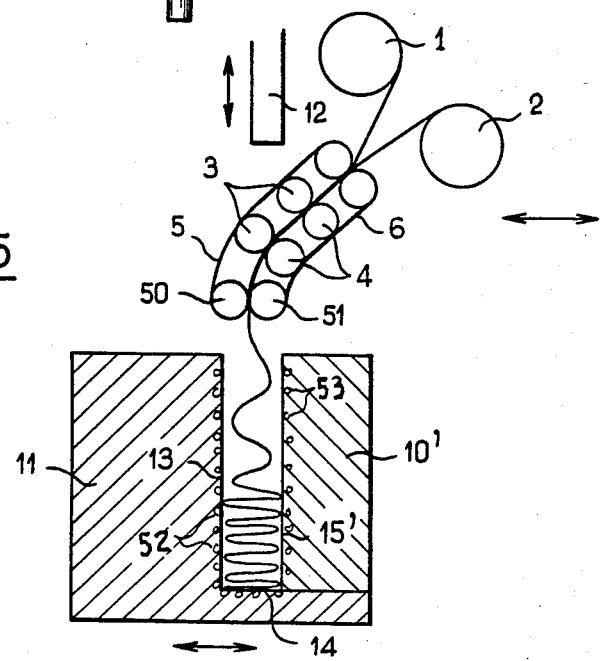

According to FIG. 5, the device comprising rollers 3 and 4 for entrainment of the film, slopes with respect to the vertical at an angle of approximately 45° and the superposed films are delivered in a vertical direction by means of two rollers 50 and 51. The cavity of the passing unit is consequently filled direct via its upper part. The pressing unit thus incorporates a support 11 comprising a vertical surface 13 and a horizontal surface 14. The support 10' comprises a vertical surface 15' and is stationary. The support 11 may slide with respect to the support 10' along the horizontal surface 14. When the cavity has been filled with the specified quantity of superposed films, the film is cut off and the film feed device is disengaged laterally. The support 11 is then displaced in translation in such a manner that the stack of the two films is compressed laterally. The movable bar 12 which had previously been wholly withdrawn from the cavity, for its part longitudinally compresses the stack of films which will yield an elementary block after the molten metal coating operation by schoopage. Heating resistances 52 and 53 render it possible to heat the film during compression by supply of heat to three of the surfaces of the cavity.

According to FIG. 6, a bearer 60 has a vertical surface 63 and a horizontal surface 64. A bar 68 of rectangular cross-section is longitudinally displaceable and its front surface 63' lies flush with the surface 63 in the idle position. A vertically displaceable support 61 has a vertical surface 65 along which it may slide with respect to the support 60, and a horizontal surface 66. In this way, the cavity is delimited by the surfaces 63 to 66. The films are fed in at the upper part of the cavity through a gap 19' present the surface 63 of the support 60 and a surface 67 of the support 61. The operation is then as follows. When the cavity has been filled with a length of films corresponding to the cavity required, the support 61 undergoes a downward vertical displacement in such manner that the stack is compressed longitudinally until the horizontal surface 66 is situated in the extension of the movable bar 68. The stack is then compressed transversely by action of the movable bar 68.

According to FIG. 7, the compression unit comprises two fixed supports 79 and 70, the support 79 comprising a horizontal surface 74 formed in an extension 89 and a vertical surface 75. The support 70 has a horizontal surface 76'. The two movable bars 78 and 80 are placed in operation to perform the compressing operations. The movable bar 78 of rectangular cross-section slides along the horizontal surface 76' and the horizontal surface 74. The movable bar 80 slides along the vertical surface 75. The film is fed to the upper part of the cavity via an opening 19" formed between the bearer 70 and the movable bar 80. This opening is delimited by two vertical surfaces 72 and 77. The compressing operation is initially performed by displacing the movable bar 78 until the surface 73 is in the extension of the surface 77 of the movable bar 80. The longitudinal compression of the stack is then performed by displacing the movable bar 80. The stack compressed in this manner may then be coated with molten metal by spraying in such manner as to form an elementary block.

The invention is not limited to the embodiments described in the foregoing. Two compressing operations have thus been described, the one being transversal and the other longitudinal, for producing an elementary block. The reason for this is that, on the one hand, the width of the folds obtainable is commonly greater than that of the corresponding elementary block, and on the other hand, because it is preferable for the sake of uniformity of mass production to have as uniform a stack as possible. Since it is only the length of the films which determines the capacitance value, the stack may be formed in optional manner within the cavity and a single compressing operation may be performed.

According to FIG. 8, a single film 80 is utilised to produce the block. It is metallised on both surfaces and carries two offset metallisations 81,82 extending up to the edge of the film at one side and leaving uncovered a margin 85,86 respectively, preventing a short-circuit being establised between the metallisations 81,82 during the molten metal coating action by spraying. The film may also be coated on both its surfaces with a lacquer making it possible to assure the bonding of the stack during the compression stage, the latter preferably being performed under heating action. The lacquer may be a polycarbonat sprayed in a solution of methylchloride, or of the hot melt type such as a polyamid or a copolyamid.

According to FIG. 9, a film 90 is provided on its upper surface with longitudinal metallisation strips 91 separated by gaps 93, and on its lower surface with longitudinal metallisation strips 92 separated by gaps 94. The gaps 93 are situated in alignment with the centres of the strips 92, and in analogous manner, the gaps 94 are situated in alignment with the center of the strips 91. After the stack is formed, a mother capacitor block is obtained, which is cut abreast of the gaps 93 and 94 to provide individual capacitor blocks which will subsequently be metallised by spraying with molten metal. The presence of the gaps 93 and 94 has the result that after cutting, the individual blocks have the same appearance as those produced with the film of FIG. 8.

According to FIG. 10, the film which is identical moreover to that of FIG. 9, may be coated on both its surfaces with a layer of lacquer 95 in the case of the upper surface and 96 for the lower surface, making it possible to assure the bonding of the stack during the compression stage, the latter preferably being performed under heating action.

I claim:
1. A method for the production of a multilayer capacitor block comprising the steps of:
   (a) unwinding the feeding, into a cavity, at least one metallized film which forms a succession of alternately insulating and conductive layers comprising laterally offset metallisations;
   (b) at least partially filling the cavity with said film, under at least the action of gravity, in such a manner so as to form a stack comprising successive folds along a longitudinal direction and in contact with two sides of the cavity situated in a first lateral direction, the lateral edges of the said metalized film being situated in a second lateral direction;

(c) compressing the stacked successive folds along the longitudinal direction;

(d) compressing the stacked successive folds along the first lateral direction; and (e) equipping the block with electrical connections.

2. A method according to claim 1, wherein step (d) includes the step of coating, with molten metal, the lateral edges of said film along the second lateral direction, said coating being accomplished by spraying the molten metal onto the lateral edges.

3. A method according to claim 2, wherein the step of coating is performed when the block is within the cavity.

4. A method according to claim 1 wherein step (d) is practiced between steps (b) and (c).

5. A method according to claim 1 wherein step (d) is practiced after step (b).

6. A method according to claim 1 further comprising the step of heating the stack of successive folds during at least the compressing of the stacked successive folds of step (c).

7. A method according to claim 6, wherein heating the stack is practiced such that the temperature equally assures heat-processing of the stack.

8. A method according to claim 1, further comprising the step of coating the film on at least one surface thereof with a lacquer to ensure the bonding of the stack when compressed.

9. A method according to claim 1, wherein said film has a plurality of laterally spaced-apart metallizations obtained by cutting a mother capacitor into separate blocks prior to step (d).

10. A method for the production of a multilayer capacitor block comprising the steps of:

(a) feeding, into a cavity defined by at least one pair of relatively movable support members, at least one metalized film of the type having alternately disposed insulating and conducting layers and laterally-offset metalizations so as to form a stack of said film comprising multiple successive folds;

(b) moving one of said pair of support members relative to the other of said pair of support members to reduce a first dimension of said defined cavity to thereby responsively compress said stack in a first direction; and (c) reducing a second dimension of said defined cavity, different from said first dimension, to responsively compress said stack in a second direction which is different from said first direction.

11. A method of producing a multilayer capacitor block comprising the steps of:

(a) feeding, into a cavity having predetermined lateral and longitudinal dimensions, at least one metalized film of the type having alternately disposed insulating and conducting layer and laterally offset metalizations;

(b) allowing said film to at least partially fill said cavity to form a stack of said film therein comprising multiple successive folds;

(c) reducing the longitudinal dimension of said cavity to responsively compress said stack in the longitudinal direction; and (d) reducing the lateral dimension of said cavity to responsively compress said stack in the lateral direction.

12. A method as in claim 11 wherein step (d) is practiced before step (c).

* * * * *